Feb. 24, 1953 R. L. TRENT 2,629,833

TRANSISTOR TRIGGER CIRCUITS

Filed April 28, 1951 4 Sheets-Sheet 1

INVENTOR
R. L. TRENT
BY
H. A. Burgess
ATTORNEY

Feb. 24, 1953 R. L. TRENT 2,629,833

TRANSISTOR TRIGGER CIRCUITS

Filed April 28, 1951 4 Sheets-Sheet 2

INVENTOR
R. L. TRENT

BY H. A. Burgess

ATTORNEY

INVENTOR
R. L. TRENT
BY
H. A. Burgess
ATTORNEY

Feb. 24, 1953 R. L. TRENT 2,629,833

TRANSISTOR TRIGGER CIRCUITS

Filed April 28, 1951 4 Sheets-Sheet 4

INVENTOR
R. L. TRENT
BY
H. A. Burgess
ATTORNEY

Patented Feb. 24, 1953 2,629,833

UNITED STATES PATENT OFFICE 2,629,833

TRANSISTOR TRIGGER CIRCUITS

Robert L. Trent, Far Hills, N. J., assignor to Bell Telephone Laboratories, Incorporated, New York, N. Y., a corporation of New York Application April 28, 1951, Serial No. 223,523

28 Claims. (Cl. 307—88)

Figures 1, 2, 3A, 3B, 4:
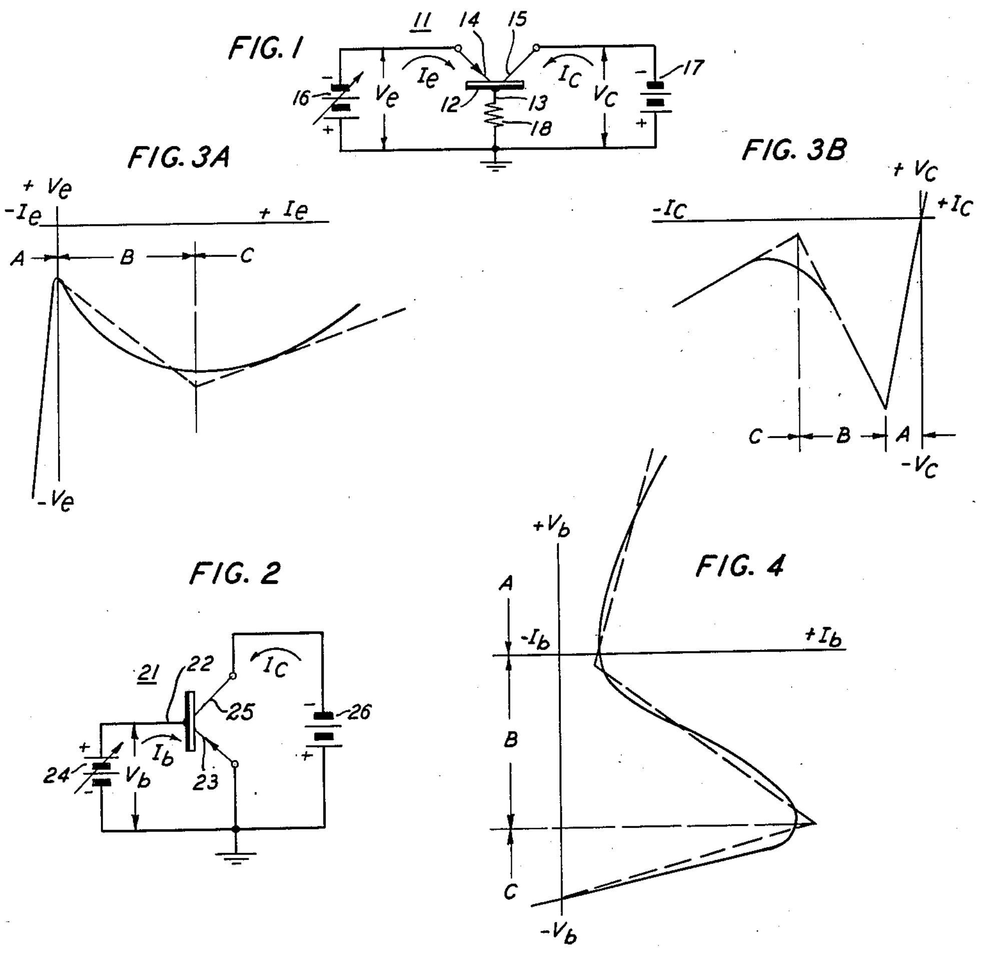

This invention relates to circuits which operate as negative resistances over at least a portion of their operating range and is particularly applicable, although not necessarily limited, to transistor trigger circuits of the type disclosed in an application of A. P. Rack, Serial No. 79,861, filed March 5, 1949.

It is an object of this invention to modify the current-voltage characteristics of such a circuit.

A more specific object of the invention is to modify the positive slope regions of a circuit current-voltage characteristic, at least a portion of which has a negative slope.

Another object of the invention is to modify the current-voltage characteristics of a circuit which operates as a negative resistance over at least a portion of its operating range to obtain desired slopes over given regions of characteristics.

Another object is to modify the emitter and collector characteristics of a transistor trigger circuit.

It is also an object of the invention to equalize the positive impedances displayed by a trigger circuit when operating in any of its two or more positive impedance regions.

Transistor trigger circuits of several types are disclosed in the above-mentioned Rack application. The central element of these circuits is a current multiplication transistor which may, for example, be of the type described in an article by R. M. Ryder and R. J. Kircher, published in the Bell System's Technical Journal for July 1949 on page 367. One of these circuits comprises a transistor connected in a grounded emitter configuration. This circuit is voltage controlled or short circuit stable and its base current-voltage characteristic generally resembles the letter S. Another circuit disclosed in the Rack application comprises a transistor connected in a grounded base configuration but including a feedback promoting resistor in series with the base electrode. This circuit is essentially current controlled and is denominated open circuit stable; its emitter and collector current-voltage characteristics generally resemble the letter N.

The current-voltage characteristics of these circuits contain a negative resistance region bounded on either side by positive resistance regions. In the normal case the slope of the positive resistance regions will be unequal and in general bear no relation to each other. In accordance with several embodiments of the invention described below in detail for purposes of illustration, biased asymmetric devices, such as germanium crystal diodes for example are inserted in series or parallel with other circuit elements to control the slopes, over chosen ranges, of the characteristics. It is thus possible to obtain the desired impedances regardless of the operating point of the circuit. A feature of the invention is, therefore, that the positive slope regions of the trigger circuit characteristics may be given the same slope, if desired, so that the impedance of the circuit presented to an output circuit will be the same in both positive slope regions.

Figure 5:
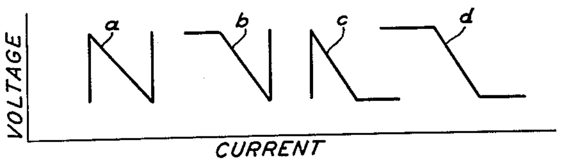
Figure 6:
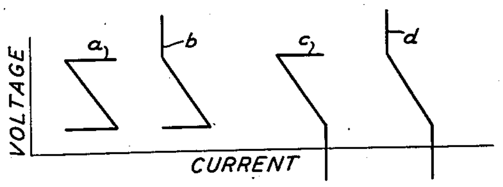

These and other objects and features of the invention may be better understood from a consideration of the following detailed description when read in accordance with the attached drawings in which:

Figs. 1 and 2 illustrate prior art trigger circuits disclosed in detail in the above-mentioned Rack application and Figs. 3A, 3B, and 4 are current-voltage characteristics of the circuits of Figs. 1 and 2, respectively;

Figs. 5 and 6 illustrate idealized current-voltage characteristics of trigger circuits to illustrate the objects of the invention; and Figs. 7 through 22 illustrate, schematically, transistor trigger circuits embodying principles of the present invention and the current-voltage characteristics for such circuits.

Referring now to the drawings, Fig. 1 shows a current-multiplication transistor 11 having a semiconductive body 12 with which a base electrode 13 makes ohmic contact and with which an emitter electrode 14 and a collector electrode 15 make rectifier contact with the surface of the body. The emitter electrode 14 is biased in the reverse direction by a battery 16 while the collector 15 is biased by a battery 17, also for conduction in the reverse direction. A feedback resistor 18 is connected in series with the base electrode 13 to promote the feedback from the collector circuit to the emitter circuit which gives rise to the negative resistance portion of the emitter and collector current-voltage characteristics illustrated respectively in Figs. 3A and 3B. This is the basic open circuit stable or current controlled trigger circuit mentioned above, and which is described in detail in the above-mentioned Rack application. The arrows in the characteristic of Fig. 3, as well as those in subsequent characteristics, labeled $I_e$ and $I_c$ indicate the positive direction of flow for the emitter and collector currents respectively. These directions are taken in accordance with the usual transistor current convention, i. e. electrode currents are positive when they flow into the semiconductive body. In accordance with the convention, the emitter current will normally be positive while the collector current will normally be negative. Since the base current is the algebraic difference of the two, it will be positive when the current amplification factor $\alpha$ is greater than one.

The voltage controlled or short-circuit stable trigger circuit is shown in Fig. 2. The transistor 21 has its base electrode 22 biased positively with respect to the grounded emitter 23 by the battery 24 while the collector electrode 25 is biased to conduct in the forward direction by the battery 26. The base current-voltage characteristic of this circuit is illustrated in Fig. 4. The circuits just described are either astable, monostable, or bistable depending on whether the load line intersects only the negative resistance region of the characteristic, one of the positive resistance regions, or both the positive resistance regions, respectively.

Dotted lines have been superimposed on the current-voltage characteristics of Figs. 3 and 4 to obtain straight line approximations of the normal characteristics. Each of the characteristics, it may be seen, has a negative resistance portion bounded on either side by positive resistance regions. It may also be seen that the characteristic of Figs. 3A and 3B, in general, resembles the letter N while that of Fig. 4 resembles the letter S.

In many large signal switching applications, such as binary counters, monostable multivibrators, etc., the normal asymmetric positive resistance regions displayed by these characteristics may place undesirable triggering requirements upon the circuit designer. In accordance with principles of the present invention, the positive resistance regions of these characteristics are modified to obtain the desired impedances in either of the positive slope regions. The idealized current-voltage characteristics shown in Figs. 5 and 6 represent the various characteristics that may be desirable. For example the characteristics of Fig. 5 represent idealized open-circuit stable negative resistance types, characteristics comprising respectively curve A, voltage to voltage; curve B, current to voltage; curve C, voltage to current; and curve D, current to current. Those of Fig. 6 represent idealized short-circuit stable negative resistance types and illustrate, curve A, current to current; curve B current to voltage; curve C, voltage to current; and curve D, voltage to voltage.

For descriptive purposes, the characteristics of Figs. 3A, 3B and Fig. 4 have been divided into three regions as shown in the drawings; regions A and C are the positive resistance regions while region B is the negative resistance region. Further although these trigger circuits may be employed as four terminal networks, for example, in multivibrator applications, they will be described herein as two terminal networks. The characteristics used for illustrative purposes in the ensuing description are the straight line approximations illustrated by the dotted line curves of Figs. 3A, 3B and Fig. 4.

By way of example, there will be first illustrated circuits by which the idealized voltage to voltage characteristic, curve A of Fig. 5, may be obtained.

Figure 7:
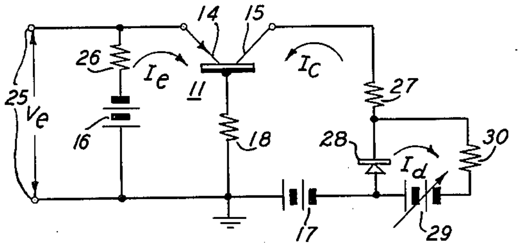

Referring now to Fig. 7, a transistor 11 is connected in a two terminal trigger circuit of the open circuit stable type having terminals 25 connected to the emitter circuit, a feedback promoting resistor 18, emitter biasing battery 16, and collector biasing battery 17 as described in connection with Fig. 1. Also included in the emitter circuit is a "load line" resistor 26 which determines the operating point or points of the trigger circuit. A resistor 27 is also included in the collector circuit to limit the collector current and protect the collector contact from damage.

Figure 8:
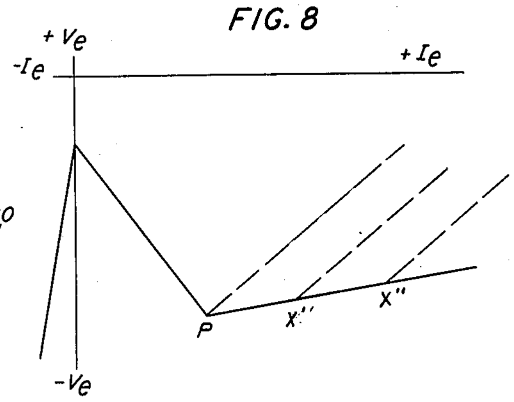

The idealized emitter current-voltage characteristic of the circuit as thus far described is illustrated by the solid line curve of Fig. 8. This is the characteristic "looking in" at the terminals 25. In accordance with a first principle of the invention, the positive slope in region C, which is the higher emitter current positive resistance region, is increased by limiting the collector current when the circuit is operating in region C, equivalent to inserting a large resistance in the collector circuit when or after the turnover point P is reached. This is accomplished by inserting an asymmetric device 28, for example, a germanium crystal diode, in series with the collector resistor 27 which is itself in series with the collector 15. The device 28 is poled for easy current flow in the direction of conventional positive collector current flow which is opposite to the direction of normal collector current flow. However, a bias is applied to the device 28 by a biasing battery 29 in series with a resistor 30 so the device will be its low resistance or conducting state until the desired turnover point, for example P, X' or X'', determined by the emitter current, is obtained. At this point the collector current will exceed the biasing current $I_d$ flowing in the loop comprising the device 28, the battery 29 and resistor 30 to permit the device 28 to operate in its high resistance condition. The slope of the characteristic in region C will then be increased as illustrated by the dotted modifications of the solid line curve. The turning point at which the slope of region C is changed to the higher value may be chosen at will by varying the biasing current provided by battery 29.

Figure 9:
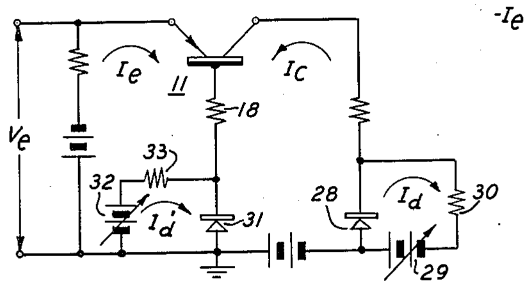
Figure 10:
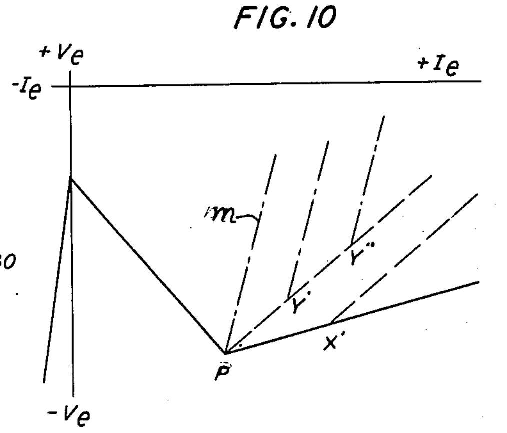

Once the collector current is limited, and since the base current is the algebraic difference of the collector and emitter currents, the slope in region C may be further increased by inserting a second asymmetric device 31, biased by battery 32 in series with resistor 33, in series with the base resistor 18 as illustrated in Fig. 9. The device 31 is poled for easy current flow in the direction of conventional positive base current flow which is also the direction of normal base current flow. As long as the device 28 is a low resistance, the collector current ($-I_c$) exceeds the emitter current ($I_e$) due to the current multiplication phenomena of the transistor and the base current is positive, biasing the device 31 in its low resistance condition, assuming the base current to exceed the biasing current $I_d'$. But when device 28 switches to its high resistance condition, the collector current is limited, allowing the emitter current, plus the biasing current to exceed the collector current and permitting the device 31 to operate in its reverse condition which further limits the collector current. When the second asymmetric device is included, the emitter characteristic will be further modified as illustrated by the broken line curves of Fig. 10. If the devices switch to their high resistance conditions at the same emitter current the characteristic in region C will be that illustrated by the broken line curve $m$. However, the biasing current for the device 31 may be varied to select another turning point such as Y' or Y'' and produce the other modifications illustrated. Further modifications may be obtained in an obvious manner by also varying the biasing current and hence the turnover point of device 28. By proper selection of the circuit constants, the slopes of the characteristic in regions A and C may be made equal. When these impedances are equal, the impedance presented by the trigger circuit of Fig. 9 across its terminals will be the same regardless of the positive resistance region in which the circuit is operating. It will be noted that the idealized characteristic, as modified in region C by the broken line curve $m$, is approximately the voltage to voltage characteristic, curve $a$ of Fig. 5, which it was desired to obtain.

Figure 11:
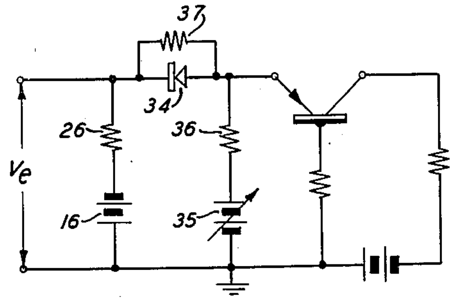
Figure 12:
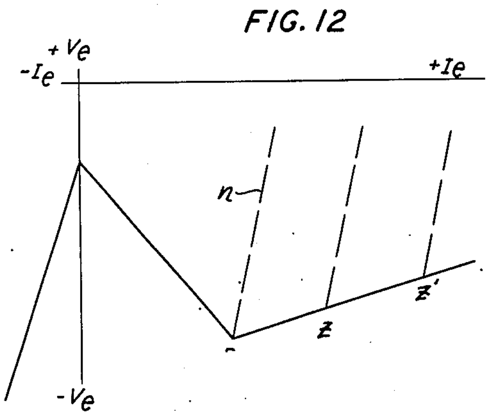

In many cases the impedances obtained in region C by using the methods just described will be sufficiently high to match the impedances obtained in region A. However, it is possible to obtain still higher impedances in region C if desired. Whereas the circuits just described embody modifications of the collector circuit to obtain high impedances in region C, the circuit of Fig. 11 illustrates a modification of the emitter circuit to limit the input current when the desired turnover point is attained. Referring to Fig. 11, an asymmetric device 34 is connected in the emitter circuit and is biased both by the emitter biasing battery 16 and resistor 26 and by an auxiliary biasing battery 35 in series with resistor 36. The asymmetric device 34 is poled and biased so that when the triggering circuit is operating in regions A and B the device will be a low impedance. When the turnover point P between regions B and C is attained the input current overcomes the asymmetric device bias at which time the device becomes a high resistance and limits the input current. The slope of the characteristic shown in Fig. 12 in region C will then be that represented by the dotted line $n$. Other turning points such as Z or Z' may be selected by suitable adjustment of battery 35.

The values for the circuit components of the circuit shown in Fig. 11 may be so chosen that equal slopes in the positive resistance regions may be achieved. Some control of the slope in region C may be effected, for example, by a suitable shunting resistor 37 across the asymmetric device 34. It may therefore be concluded that by the general method of employing biased diodes to modify the emitter negative resistance characteristic of the transistor, as illustrated by the circuits of Figs. 7, 9 and 11, a range of impedance values in region C may be obtained. The exact method or combination of methods will depend upon the circuit configuration under consideration and the exact slopes desired.

Figure 13:
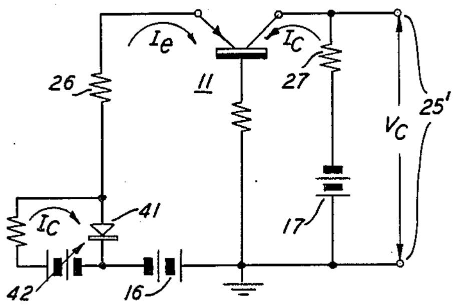

Heretofore in the detailed description the circuits described have comprised two terminal networks with the two terminals connected to the emitter circuit of the transistor. By analogous reasoning it is possible to connect the terminals to the collector circuit of the transistor, whereby the terminal current-voltage characteristic of an unmodified trigger circuit of the grounded base configuration would be the curve of Fig. 3B. Referring to Fig. 13 such a trigger circuit comprises the transistor 11, collector biasing battery 17, emitter biasing battery 16, and terminals 25. The resistor 27 in series with the collector biasing battery is now considered the "load line" resistor since it determines the operating point of the circuit. The resistor 26 limits the emitter current and protects the emitter contact.

Figure 14:
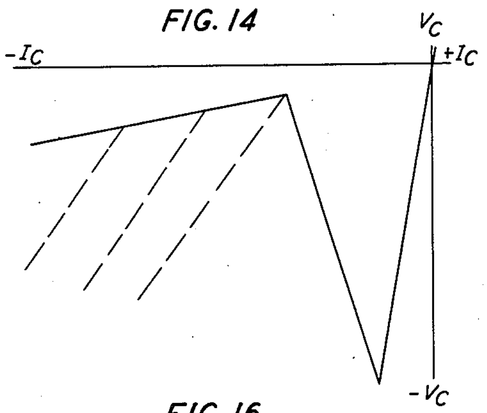

The normal straight line approximation of the collector current-voltage characteristic is illustrated by the solid line curve of Fig. 14. In this case also it is the impedance and hence the characteristic slope in region C, the higher current positive resistance region, which it is desired to increase to obtain equal impedances in the positive resistance regions A and C. To do this in accordance with one principle of the invention the "load" current, which in this case is the emitter current, is limited when the desired turnover point P is attained, equivalent to raising the series resistance in the emitter circuit to a high value. This is accomplished by inserting the biased asymmetric device 41 in the emitter circuit. When operating in regions A and B the biasing current supplied by the battery 42 exceeds the emitter current flowing due to the voltage across the terminals 25 so that the asymmetric device is in its low resistance condition. The device switches to its high resistance condition at the desired point in region C, which is selected by a proper adjustment of the biasing battery 42, and, when in its high resistance condition, increases the slope in region C to that illustrated by the dotted line modifications shown in Fig. 14.

Figure 15:
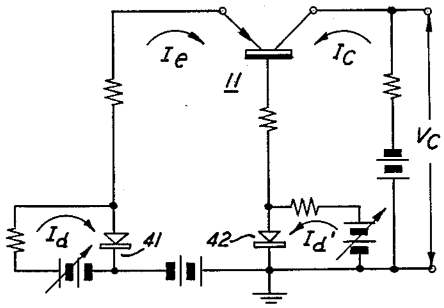
Figure 16:
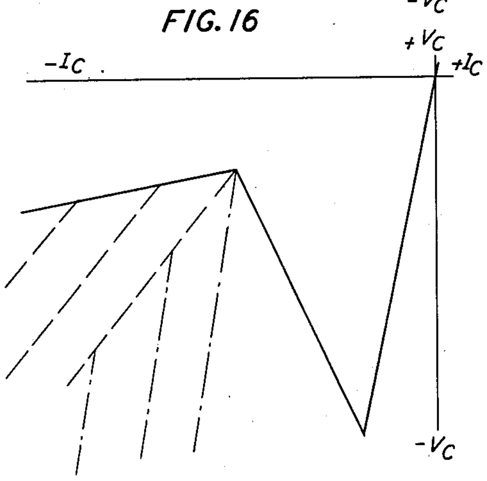

Use may again be made of the fact that when the load current, i. e., the emitter current, is limited, a second biased asymmetric device 42 may be inserted in series with the base electrode, as shown in Fig. 15, to further increase the slope in region C. The operation of this circuit is analogous to the operation of the circuit of Fig. 9 with the characteristic in region C being represented by the broken line curves in Fig. 16. While the device 41 is in its low resistance condition, the emitter current plus the bias current $I_d'$ keep the device 42 in its low resistance condition. But when the device 41 reverses to limit the emitter current, the collector current ($-I_c$) overcomes the emitter and bias currents to place the device 42 in its high resistance condition and further increase the slope in region C.

Figure 17:
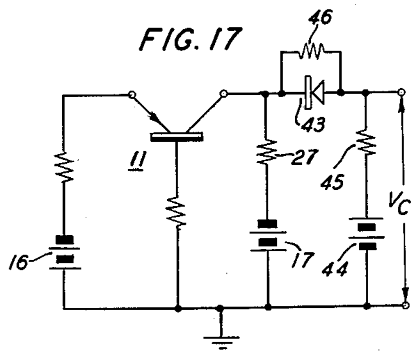
Figure 18:
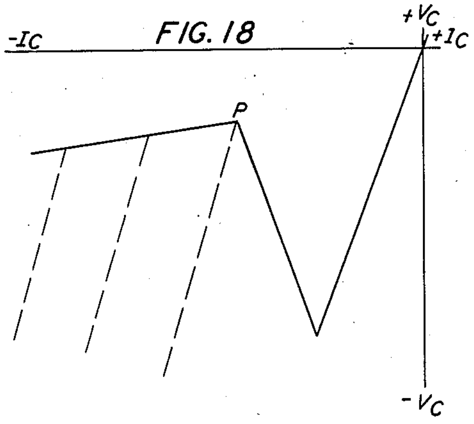

An increase in the slope in region C is also attainable by the circuit shown in Fig. 17 in a manner analogous to the emitter case shown in Fig. 11. A normally conducting asymmetric device 43, biased by the collector biasing battery 17 and resistor 27 and the auxiliary biasing battery 44 and resistor 45 is inserted in the input circuit, i. e., the collector circuit. When the desired turnover point between regions B and C, or in region C, is attained, the asymmetric device 43 becomes a high resistance and limits the input current which results in an increase of the slope in region C. The asymmetric device is caused to switch to its high resistance condition at the proper time by a suitable adjustment of the auxiliary biasing battery 44. Suitable values for the circuit components of the circuits illustrated in Fig. 17 may be chosen to obtain equal slopes in the positive resistance regions, if desired, and control of the slope in region C may be achieved by a suitable shunting resistor 46 across the asymmetric device 43.

It may be concluded that by the general method of employing biased diodes to modify the collector current-voltage negative resistance characteristic of the transistor a range of impedance values in region C may be obtained.

Although the discussion thus far has been confined to means for modifying transistor negative resistance characteristics only in the positive resistance regions, and more particularly in region C, it should be noted that as described in the above-mentioned Rack application the slope in the negative resistance region, namely region B may be controlled to some extent by varying the magnitude of the feedback promoting resistor 18 which is connected in series with the base electrode. Also, as described in another application by A. J. Rack, Serial No. 185,041 filed September 15, 1950, which issued as Patent 2,579,336, dated December 18, 1951, the slope in region A may be increased by inserting in series with the base electrode an asymmetric device which is biased in its high resistance condition when the circuit is operating in region A but which switches to its low resistance condition in regions B and C.

Figure 19:
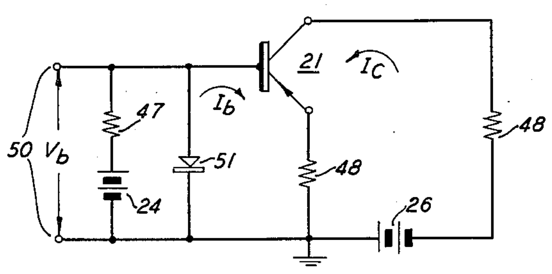
Figure 20:
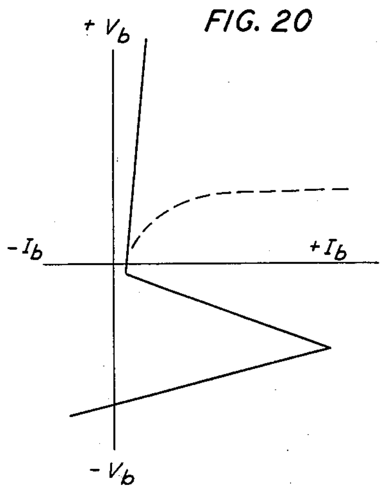

Asymmetric devices may be also inserted in trigger circuits of the short-circuit stable type illustrated in Fig. 2 to modify the base current-voltage characteristic of such a circuit. Although it was said above that this characteristic, as shown in Fig. 4, in general resembles the letter S, its straight line approximation more nearly resembles the idealized current to voltage characteristic, curve B of Fig. 6 than it does the idealized current to current characteristic, curve A of Fig. 6. Referring now to Fig. 19, there is shown a transistor 21 connected in a grounded emitter configuration and having a collector biasing battery 26 and a battery 24 to bias the base positive with respect to the collector. A load line resistor 47 is connected in series with the base biasing battery 24 and resistors 48 and 49 are connected in series with the collector and emitter electrodes, respectively, to limit the current in these electrodes. The terminal current-voltage characteristic of the circuit thus far described, the terminals 50 being connected in the base circuit, is illustrated by the solid line curve of Fig. 19. To increase the slope of the characteristic in region A so that the idealized current to current characteristic, curve A of Fig. 6, may be obtained, or at least approximated, an asymmetric device 51 is connected in shunt with the input terminals 50. The addition of the asymmetric device results in the dotted line modification of the normal characteristic shown in Fig. 19 which is more nearly the S type characteristic desired. The device 51 is a low impedance shunt across the input for positive base or input currents and a high impedance shunt for negative base currents. The device 51 may be biased in an obvious manner to shift its turnover point.

Figure 21:
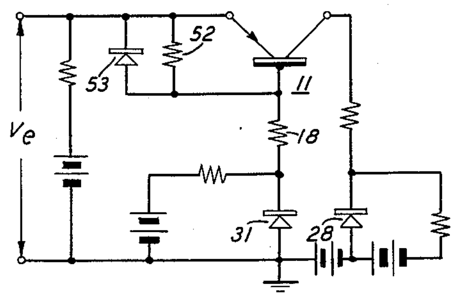
Figure 22:
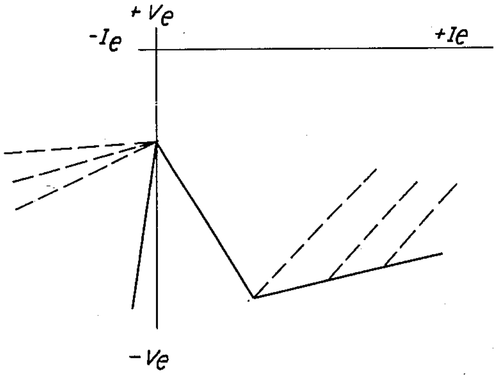

Other idealized characteristics shown in Figs. 5 and 6 may also be obtained by the use of biased asymmetric devices. For example the idealized current to voltage characteristic, curve B of Fig. 5, may be obtained by decreasing the emitter characteristic slope in region A. Referring to Fig. 21 this may be accomplished by shunting the emitter electrode and the base electrode by a resistor 52 in parallel with the asymmetric device 53 which is poled as shown in the figure. This method of decreasing the slope in region A is described in a copending application of A. E. Anderson, Serial No. 166,733, filed June 7, 1950. The slope of the characteristic in region C may then be increased by connecting the biased asymmetric devices 28 and 31 in the collector and base circuits respectively as previously described in connection with Fig. 9. If the idealized current to current characteristic, curve D of Fig. 5, is desired the asymmetric devices 28 and 31 will be omitted. The idealized voltage to current characteristic, curve C of Fig. 5, is approximately that obtained in the unmodified trigger circuit of the open circuit stable type. Also the idealized current to voltage characteristic, curve B of Fig. 6, is approximately that obtained with the unmodified trigger circuit of the short stable type shown in Fig. 2.

Although the invention has been described as relating to specific embodiments other embodiments and modifications will readily occur to one skilled in the art so that the invention should not be deemed limited to the embodiments specifically described. For example, the asymmetric devices need not be germanium crystal diodes but may be any of the other well-known devices which have asymmetric conducting properties and may even comprise resistors by-passed by relay operated shorting contacts as described in the second-mentioned Rack application.

What is claimed is:

1. A circuit having negative resistance properties which comprises a transistor having an emitter electrode and a collector electrode and a base electrode, a first circuit including said emitter and base electrodes, a second circuit including said collector and base electrodes, means to promote sufficient feedback from said second circuit to said first circuit over at least a portion of the operating range of said transistor to give said transistor negative resistance properties, at least one asymmetrically conducting device connected in series with one of said circuits, means to bias said device in its low resistance condition when said transistor is operating in its lower-current positive resistance region and in a substantial portion of its negative resistance region, and said bias adapted to permit the said device to operate in its high resistance condition when said transistor is operating in its high-current positive resistance region.

2. A circuit having negative resistance properties which comprises a current multiplication transistor having a body of semiconductive material and an emitter electrode and a collector electrode making operating contact with said body, a first circuit including said emitter electrode and said body, a second circuit including said collector electrode and said body, means regeneratively coupling said first and second circuits to give said transistor negative resistance properties over at least a portion of its operating range, and an asymmetrically conducting device connected in series with one of said electrodes and poled for condition in the direction opposite to the direction of normal current flow for the electrode with which it is connected in series.

3. The combination in accordance with claim 2 and means to bias said device in its low resistance condition over at least a portion of the operating range of said transistor including at least a substantial portion of the negative resistance region of said transistor.

4. A negative resistance circuit comprising a current multiplication transistor having an emitter electrode, a collector electrode, and a base electrode, an external circuit connected across said emitter and base electrodes, means to promote sufficient feedback from said collector to said emitter to give said transistor negative resistance properties, and a first asymmetrically conducting device connected in circuit with said collector and base electrodes and poled for easy current flow in the direction opposite to the direction of normal collector current.

5. The combination with claim 4 of means for applying to said asymmetric device a biasing current proportional to bias said asymmetric device, for collector currents below a predetermined value, in its low resistance condition and, for collector currents above said predetermined value, in its high resistance condition.

6. The combination in accordance with claim 4 and a second asymmetrically conducting device connected in series with said base electrode and poled for easy current flow in the direction of flow of normal base current.

7. The combination in accordance with claim 6 and means to apply a biasing current to said second asymmetric device which opposes the flow of normal base current.

8. The combination in accordance with claim 7 wherein the magnitude of said biasing current is proportioned to be less than the base current responsive to collector currents which flow through said first device in its low resistance condition.

9. A trigger circuit comprising a transistor having an emitter electrode, a collector electrode and a base electrode, a first circuit including said emitter and base electrodes, a second circuit including said collector and base electrodes, means for regeneratively coupling said second and first circuits over at least a range of electrode currents, and an asymmetric device connected in said second circuit in series with said collector and poled for easy current flow in the direction opposite to that of normal collector current.

10. The combination with claim 9 of means for applying to said asymmetric device a biasing current proportional to bias said asymmetric device in its low resistance condition for all collector currents below a predetermined value and in its high resistance condition for all collector currents above said predetermined value.

11. The combination in accordance with claim 10 wherein said biasing means bias said asymmetric device in its low resistance condition in the lower emitter current positive resistance region and substantially all of the negative resistance region but permit said device to operate in its high resistance condition in the higher emitter current positive resistance region.

12. The combination in accordance with claim 9 and a resistor in parallel with said asymmetric device.

13. The combination in accordance with claim 9 and an external circuit connected to said first circuit.

14. The combination in accordance with claim 9 and an external circuit connected to said second circuit.

15. A negative resistance circuit comprising a transistor having an emitter electrode, a collector electrode and a base electrode, an external circuit connected to an emitter-base circuit, means to promote sufficient feedback from a collector-base circuit to said emitter-base circuit to give said transistor negative resistance properties over at least a portion of its operating range, a first asymmetrically conducting device connected in series with said collector electrode and poled for easy current flow in the direction opposite to the direction of normal collector current and a second asymmetrically conducting device connected in series with said base electrode and poled for easy current flow in the direction of normal base current.

16. The combination with claim 15 and means for applying biasing currents to said asymmetrically conducting devices which are proportioned to bias said asymmetric devices in their low resistance condition for values of collector current below a predetermined value and in their high resistance condition for values of collector current above said predetermined value.

17. The combination with a circuit having negative resistance properties which comprises a transistor having an emitter electrode, a collector electrode, and a base electrode, a first circuit including said emitter and base electrodes, a second circuit including said collector and base electrodes, and means to promote sufficient feedback from said second circuit to said first circuit to give said transistor negative resistance properties over at least a portion of its operating range, of an asymmetrically conducting device connected in series with said emitter electrode and poled for easy current flow in the direction opposite to the direction of flow of normal emitter current.

18. The combination with claim 17 of a resistor in parallel with said asymmetric device.

19. The combination in accordance with claim 17 and an external circuit connected to said first circuit.

20. The combination in accordance with claim 17 and an external circuit connected to said second circuit.

21. The combination with claim 17 of means to bias said asymmetric device in its low resistance condition for values of emitter current below a predetermined value.

22. The combination in accordance with claim 21 wherein said means biases said asymmetric device in its low resistance condition when said transistor is operating in its lower emitter current positive resistance region and in substantially all of its negative resistance region.

23. A negative resistance circuit comprising a transistor having an emitter electrode, a collector electrode and a base electrode, a resistor connected to said base electrode, an external circuit connected to said emitter electrode and the terminal of said resistor remote from said base electrode, a collector circuit including said collector electrode. said resistor, and said base electrode, said resistor proportioned to regeneratively couple said collector and emitter electrodes over at least a range of operating currents, an asymmetrically conducting device connected in series with said emitter electrode and poled for easy current flow in a direction opposite to the direction of normal emitter current flow, and means for applying to said asymmetrically conducting device a biasing current proportioned to bias said asymmetric device in its low resistance condition for emitter currents below a predetermined value and in its high resistance condition for emitter currents above said predetermined value.

24. The combination in accordance with claim 23 and a resistor in parallel with said asymmetric device.

25. A negative resistance circuit comprising a transistor having an emitter electrode, a base electrode and a collector electrode, a resistor connected to said base electrode, a two terminal external circuit connected to said collector electrode and the terminal of said resistor remote from said base electrode, an asymmetrically conducting device connected in series with said collector and poled for easy current flow in the direction opposite to the direction of normal collector current flow, and means for applying to said asymmetrically conducting device a biasing current proportioned to bias said asymmetric device in its low resistance condition for all values of collector current below a predetermined value and in its high resistance condition for all values of collector current above said predetermined value.

26. The combination in accordance with claim 25 having a resistor in parallel with said asymmetric device.

27. A trigger circuit comprising a transistor having an emitter electrode, a collector electrode and a base electrode, a first circuit including said emitter and base electrodes, a second circuit including said collector and base electrodes, means in the common branch of said first and second circuits to give said transistor negative resistance properties over a portion of its operating range, said negative resistance portion being bounded on either side by a higher current positive resistance region and a lower current positive resistance region, respectively, a load circuit connected to one of said first and second circuits, and means comprising a first asymmetrically conducting device connected in the other of said first and second circuits to limit the current in said other circuit when said transistor is operating in its higher current positive resistance region, and means to further limit the current in said other circuit comprising a second asymmetrically conducting device connected in series with said base electrode.

28. The combination in accordance with claim 27 and means for biasing said first and second asymmetrically conducting devices in their low resistance condition for currents below said higher current positive resistance region, said means for biasing said second device proportioned to bias said second device in its high resistance condition in response to the operation of said first device in its high resistance condition.

ROBERT L. TRENT.

No references cited.